(12) United States Patent
Staab et al.

(10) Patent No.: US 9,085,084 B2
(45) Date of Patent: Jul. 21, 2015

(54) ROBOT MANIPULATOR SYSTEM

(71) Applicant: ABB AG, Mannheim (DE)

(72) Inventors: Harald Staab, Mannheim (DE); Sönke Kock, Västeras (SE)

(73) Assignee: ABB AG, Mannheim (DE)

( * ) Notice: Subject to any disclaimer, the term of this patent is extended or adjusted under 35 U.S.C. 154(b) by 81 days.

(21) Appl. No.: 13/907,053

(22) Filed: May 31, 2013

(65) Prior Publication Data

US 2013/0268117 A1 Oct. 10, 2013

Related U.S. Application Data

(63) Continuation of application No. PCT/EP2010/007274, filed on Dec. 1, 2010.

(51) Int. Cl.
*B25J 9/16* (2006.01)
*B25J 13/08* (2006.01)
*B25J 19/00* (2006.01)

(52) U.S. Cl.
CPC .............. *B25J 9/1694* (2013.01); *B25J 13/087* (2013.01); *B25J 19/00* (2013.01); *Y10S 901/09* (2013.01); *Y10S 901/46* (2013.01)

(58) Field of Classification Search
CPC ...... G05D 1/0227; B25J 13/00; B25J 13/087; B25J 19/0075; B25J 13/089; B25J 19/00; B25J 9/1694; H05B 2203/036; H05B 1/0227; H05B 1/0272; H05B 3/342; H05B 3/34; H05B 1/0236; H05B 6/688; Y10S 901/46; Y10S 901/09
See application file for complete search history.

(56) References Cited

U.S. PATENT DOCUMENTS

| | | | | | |
|---|---|---|---|---|---|
| 5,172,950 | A | * | 12/1992 | Benecke | 294/86.4 |
| 5,212,432 | A | * | 5/1993 | Ohtani et al. | 318/568.11 |
| 6,184,504 | B1 | * | 2/2001 | Cardella | 219/513 |
| 6,304,803 | B1 | * | 10/2001 | Dao | 701/36 |
| 6,505,098 | B1 | * | 1/2003 | Sakamoto et al. | 700/245 |
| 6,617,845 | B1 | * | 9/2003 | Shafiyan-Rad et al. | 324/207.16 |
| 6,754,560 | B2 | * | 6/2004 | Fujita et al. | 700/245 |

(Continued)

FOREIGN PATENT DOCUMENTS

| | | |
|---|---|---|
| JP | 62-292390 A | 12/1987 |
| JP | 2007-61962 A | 3/2007 |
| WO | WO 2010/022991 A1 | 3/2010 |

OTHER PUBLICATIONS

International Search Report (PCT/ISA/210) issued on Aug. 29, 2011, by the European Patent Office as the International Searching Authority for International Application No. PCT/EP2010/007274.

*Primary Examiner* — Bao Long T Nguyen
(74) *Attorney, Agent, or Firm* — Buchanan Ingersoll & Rooney PC (57) ABSTRACT

The present disclosure is related to an exemplary robot manipulator system having a robot manipulator with a kinematic chain of stiff robot manipulator segments, which are linked together by hinged joints. A robot controller controls execution of a robot program. At least one temperature sensor provides measured temperature values. At least one heatable cover is attached onto at least one manipulator segment for applying heat energy thereon, with an amount of heat energy being controlled dependent on measured temperature values of the at least one temperature sensor.

16 Claims, 3 Drawing Sheets

(56) References Cited

U.S. PATENT DOCUMENTS

| | | | |
|---|---|---|---|
| 6,975,028 B1* | 12/2005 | Wayburn et al. | 257/718 |
| 6,993,922 B2* | 2/2006 | Wall et al. | 62/223 |
| 7,017,358 B2* | 3/2006 | Wayburn et al. | 62/115 |
| 7,511,443 B2* | 3/2009 | Townsend et al. | 318/568.2 |
| 7,914,521 B2* | 3/2011 | Wang et al. | 606/1 |
| 2007/0089557 A1* | 4/2007 | Solomon et al. | 74/490.01 |
| 2008/0011904 A1* | 1/2008 | Cepollina et al. | 244/172.6 |
| 2008/0023460 A1* | 1/2008 | Huang | 219/211 |
| 2008/0067163 A1* | 3/2008 | Axinte et al. | 219/211 |
| 2008/0147239 A1* | 6/2008 | Chiang et al. | 700/264 |
| 2008/0223844 A1* | 9/2008 | Cronn | 219/211 |
| 2008/0257094 A1* | 10/2008 | Xie et al. | 74/490.01 |
| 2009/0055019 A1* | 2/2009 | Stiehl et al. | 700/249 |
| 2009/0145671 A1* | 6/2009 | Filippov et al. | 180/9.42 |
| 2009/0326714 A1* | 12/2009 | Buckingham et al. | 700/258 |
| 2010/0080733 A1* | 4/2010 | Carlson et al. | 422/100 |
| 2010/0116081 A1* | 5/2010 | Pistor et al. | 74/490.05 |
| 2011/0154934 A1 | 6/2011 | Skourup et al. | |

\* cited by examiner

ROBOT MANIPULATOR SYSTEM

RELATED APPLICATION

This application claims priority as a continuation application under 35 U.S.C. §120 to PCT/EP2010/007274, which was filed as an International Application on Dec. 1, 2010 designating the U.S., the entire content of which is hereby incorporated by reference in its entirety.

FIELD

The present disclosure relates to a robot manipulator system, such as a system which includes a robot manipulator with a kinematic chain of stiff robot manipulator segments which are linked together by hinged joints, a robot controller for controlling execution of a robot program and at least one temperature sensor for providing measured temperature values.

BACKGROUND

It is known that robots are used for industrial applications, such as manufacturing, welding or palletizing for example. Robots can include robot manipulators having several robot manipulator segments which are connected with hinged joints to a kinematic chain to form a robot arm. Such a robot manipulator might be electrically or hydraulically powered for example. At the tip of such a robot arm, having for example five to seven degrees of freedom in movement, an end-effector can be provided, for example a gripper tool or a welding gun or such. A robot controller might be foreseen, which controls the movements of the robot manipulator according to a robot program.

Robots can be arranged within a protected environment, for example within a factory building, whereas the environment temperature of the robot might be in a range of 15° C. to 35° C., dependent on the frame conditions. Robots for welding might be suitable also for higher temperatures of their working environment. Thus, robots can be designed for a use under certain environmental conditions.

Many robots are not foreseen for use within a cold environment, for example within a freezer room for food or within cold rooms for environmental testing facilities. Many endangered components of a robot manipulator system concerning operation in such a low-temperature environment are for example the drive components, such as motors, gears, breaks, rubber sealings, resolvers or bearings, and electronic components. But also application specific additional devices such as cameras or headlights can be temperature critical components.

Based on this state of the art it would be desirable for robots with robot manipulator systems to operate also in a colder environment, for example 0° to −20° C. and below.

SUMMARY

Exemplary embodiments are directed to a robot manipulator system, comprising: a robot manipulator with a kinematic chain of stiff robot manipulator segments, which are linked together by hinged joints; a robot controller for controlling robot manipulator movement via execution of a robot program; at least one temperature sensor for providing measured temperature values; at least one heatable cover attached onto at least one manipulator segment for applying heat energy thereon; and a control unit for controlling an amount of heat energy dependent on measured temperature values of the at least one temperature sensor.

BRIEF DESCRIPTION OF THE DRAWINGS

Exemplary embodiments will be described with reference to the accompanying drawings, in which.

DETAILED DESCRIPTION

An exemplary robot manipulator system is disclosed wherein at least one heatable cover is attached onto at least one manipulator segment for applying heat energy thereon. An associated amount of heat energy is controlled by a control unit dependent on measured temperature values of at least one temperature sensor.

Exemplary embodiments can include applying heat energy onto specified areas (e.g., the most temperature critical areas) of the robot system by one or more heatable covers, so that a minimum operational temperature of associated components (e.g., critical components) can be ensured. Those components can be related to the robot manipulator and the robot arm itself, for example the motors, and gears including gear oil or breaks. Depending on the construction of the robot manipulator, some of those components can be seen as part of a stiff robot manipulator segment if they are directly mounted thereon, for example a motor drive. A heatable cover can have for example a flat, mat-like shape. It can be assumed, that in those cases an attached heatable cover does not reduce the freedom of movement of the robot manipulator. Since the heatable covers can be easily attachable onto those surface areas of a standard robot, which are representing or at least covering a temperature critical component, an easy solution for enabling a robot operating in a cold environment is provided.

On the other hand, there can be temperature critical components such as bearings and some parts of the hinged joints for example, which are not directly related to one stiff robot manipulator segment, since they are arranged moveable or pivotable in between different manipulator segments. Hence in some cases it might be not possible to attach a heatable cover directly on those parts—as an outer surface covering those parts—without reducing the freedom of movement of the robot arm. In those cases the heatable covers can be attached to one or more of the adjacent stiff robot manipulator segments, so that heat energy applied thereon is transferred to the adjacent temperature critical components, whereas the freedom of movement of the robot manipulator is not negatively reduced. Such a kind of heat transfer is rather efficient, since the relevant parts such as bearings or gears may be built of metal, which has a good heat conductance characteristic.

Heatable covers might be attached on several outer surface areas of the robot manipulator, such as in close proximity to the temperature critical components. A control mechanism can regulate the amount of heat energy, which is applied by one or more heatable covers onto one or more robot manipulator segments, dependent on a measured temperature. The measured temperature of one or more robot manipulator segments can be used as a controlled process variable, so that this measured temperature can be regulated to a certain value. It is on the other hand also possible to apply a predetermined amount of heat energy dependent on a measured ambient temperature. Of course it is possible to have different mechanisms or regulation characteristics for different heatable covers. According to exemplary embodiments, the amount of heat energy to be applied can be controlled and determined by a control unit. In an exemplary embodiment, this could be in an electrical circuit, but also for example a separate computing device. Furthermore, the heatable covers need not only be active in a case where a movement program is executed. The heatable covers can also be—at least temporarily—active when the robot is in a stand-by or wait mode.

According to an exemplary embodiment, this control or regulation functionality can be integrated within the robot controller, which can execute a robot program by controlling and coordinating the movement of the robot manipulator dependent on the associated robot program. The task of controlling, regulating, and determining heat energy which is applied by the heatable covers can be dependent on a measured temperature as an add-on functionality which can be implemented without additional hardware into the existing robot controller.

A robot controller can include a computing device and power amplifiers for the drives of the different robot manipulator segments, whereas the power amplifiers might be seen as an optional part of the robot controller. In a comparable way power amplifiers or such can be provided for driving the heat generation within the heatable covers according to the demand of the robot controller.

The robot controller can be connected to the robot manipulator with a control cable of a length of for example several meters, whereas a length of for example several tens of meters, or any desired cable, is also possible. Since the robot controller can be a temperature critical electronic component, it can be placed in a protected environment with a less critical temperature in a certain distance to the robot manipulator, for example in a control room. An exemplary maximum distance within a cold (e.g., freezer) room or such might amount to, for example, some ten meters, so that the length of an associated control cable is adaptable thereto.

In a further exemplary embodiment, an additional device can be mounted on the robot manipulator with an additional heatable cover attached thereon. Such an additional device can be specific to the working task of the robot manipulator system and can be a camera, a headlight, a gripper or such. The control of the heat energy, which is applied by the additional heatable cover, can be integrated into the robot controller. Hence additional temperature critical device components, which are not part of the robot manipulator itself, are easily enabled for operation in a cold environment.

In an exemplary embodiment of the robot manipulator system, at least one heatable cover can comprise an electrical heater, for example a heat wire. The amount of heat energy applied by an electrical heater can be easily regulated by electrical amplifiers whereas electrical cables are guidable along the robot manipulator arm without major restrictions in freedom of movement. Furthermore an electrical heater does not cause an exhaust emission within the working environment of the robot manipulator.

According to a further exemplary embodiment, at least one heatable cover can comprise a thermal insulating outer layer for thermal insulation of the environment. Hence the amount of heat energy to be applied by the heatable cover can be reduced where less heat energy disappears to the environment.

In another variant embodiment, at least one heatable cover can comprise a thermal conducting inner layer for heat energy distribution towards the manipulator segments. This can be useful especially for example where the robot manipulator segments are not as heat conductive; for example, those which are built from a compound material. Thus the heat energy can be applied in a homogenous way.

Following a further exemplary embodiment, at least one heatable cover can be glued onto an outer surface area of an associated manipulator segment. Thus, an intermediate space in between a heatable cover and a surface of a robot manipulator segment can be reduced in an advantageous way so that the flow of heat energy can be increased. Furthermore a heatable cover can be easily and durably attached to a robot manipulator segment.

According to another exemplary variant, at least one heatable cover can be lashed or strapped onto an outer surface area of an associated manipulator segment with a belt-like device. This enables on one hand an increased heat energy flow into the robot manipulator segment due to a minimized intermediate space. On the other hand this kind of attached heatable cover can be easy to disassemble, can provide increased flexibility and provide a better possibility for maintenance. The same advantages can also be gained by using a heatable cover, which can be designed and configured as a solvable pressure collar.

According to an exemplary variant, heatable covers can be attached on at least two adjacent manipulator segments which are linked together by a common hinged joint. A heatable cover is in some cases not directly attachable on a hinged joint, because it could reduce the freedom of movement of the robot arm in a broader way. This can enable an increased indirect heat transfer into the area around the hinged joint.

In a further exemplary embodiment, a flexible tube can be included in between the heatable covers attached on the adjacent manipulator segments which surround the common hinged joint and at least a part of the heatable covers. Such a tube can have an effect to thermally insulate an area around the hinged joint, so that less indirect transferred heat energy disappears to the environment. Such a flexible tube can partly be comparable with tights, for example concerning the material. But of course other materials can be used including but not limited to an elastic rubber material.

In an exemplary embodiment, the robot manipulator system includes a heatable cover attached as a flexible tube around a hinged joint, whereas the heatable cover can comprise a wire-like heating element that is arranged in the form of a helix or meander mainly crosswise to the longitudinal extension of the hinged joint. This kind of flexible tube is different relative to the aforementioned kind, because a more or less fixed cross section circumference can be desired due to the wire-like heating element having a sectional length that is nearly constant. Because the heating wire can be arranged in a helix- or meander-like manner crosswise to the longitudinal extension of the hinged joint, the heatable cover can be bendable along the longitudinal extension of the hinged joint. The heat dissipation around a hinged joint can also be reduced in an advantageous way, as it is possible to actively apply heat energy into this area.

In an exemplary embodiment, an attached heatable cover can comprise a sensor on its outer side for measuring ambient temperature and/or a sensor on its inner side for measuring the temperature of a covered area of an associated manipulator segment of the additional device, where it can be attached.

The integration of temperature sensors into a heatable cover can provide an easier overall handling of the robot system because a separate mounting of temperature sensors can be avoided therewith. Of course an inner sensor can be thermally insulated against the environment and an outer sensor can be thermally insulated against the robot manipulator segment where the heatable cover is mounted. The data connection in between the sensor and robot controller can for example comprise a wireless section. This can simplify once again an arrangement of a sensor.

According to a further exemplary variant of the robot manipulator system, the amount of heat energy to be applied by the at least one heatable cover can depend as well on the measured values of the ambient temperature and the measured values of the temperature of at least one manipulator segment. Thus it is possible to have a stronger feedback of a measured temperature within a control loop at lower ambient temperatures than at not as low ambient temperatures. The higher dissipation of heat energy into the environment at lower ambient temperatures can be compensated therewith.

In an exemplary variant, several heatable covers can be attached onto the robot manipulator. Those can comprise associated temperature sensors on their inner side, which can provide values of measured temperatures to an evaluation device. This device can be used to determine the lowest measured temperature therefrom, whereas the determined value of the lowest temperature can be provided to the robot controller. This exemplary worst case observation can increase the reliability of the temperature control, as an exemplary most disadvantageous temperature value can be the base for applying heat energy by the heatable covers. Such a lowest-value-determination can be integrated into the robot controller, but it is also possible to do this in a separate device.

In another exemplary embodiment, the robot controller can be configured to reduce a movement speed as planned while executing a robot program in case that the measured temperature values of the at least one temperature sensor are lower than a predetermined limit. The gear of a robot manipulator segment for example is sometimes arranged within a box filled with gear oil, and oil can be a temperature critical substance. An exemplary intermediate temperature range of the oil in between an absolute uncritical upper temperature and an absolute critical lower temperature can be rather broad, for example in between 10° C. and −10° C. By reducing the movement speed of the robot manipulator while executing the robot program, the material stress for the gear can also be reduced, so that an operation with reduced speed can be enabled at a lower temperature within this intermediate temperature range. An exemplary robot program can include different sections of a predetermined movement path with different given movement speeds. A speed reduction could either be realized by a downscaling of each movement speed by a certain factor or a by a kind of speed limiter. Both functionalities are implementable within the robot controller itself. While executing the robot movement at a reduced speed the gear oil will be heated by friction, so that after applying certain friction energy the oil temperature can rise to an uncritical value.

The same effect can be gained according to another exemplary variant, whereas the robot controller can be configured to execute at least temporarily a steady motion robot program if no further robot program is foreseen for execution. This steady motion program can, for example, determine a robot motion, which loads all gears and all associated drives of all robot manipulator segments in a homogenous manner. So additional friction heat can be applied homogenously and a cooling down of a robot manipulator for the associated gear components within an off-duty state can be avoided in an advantageous way.

Figure 1:
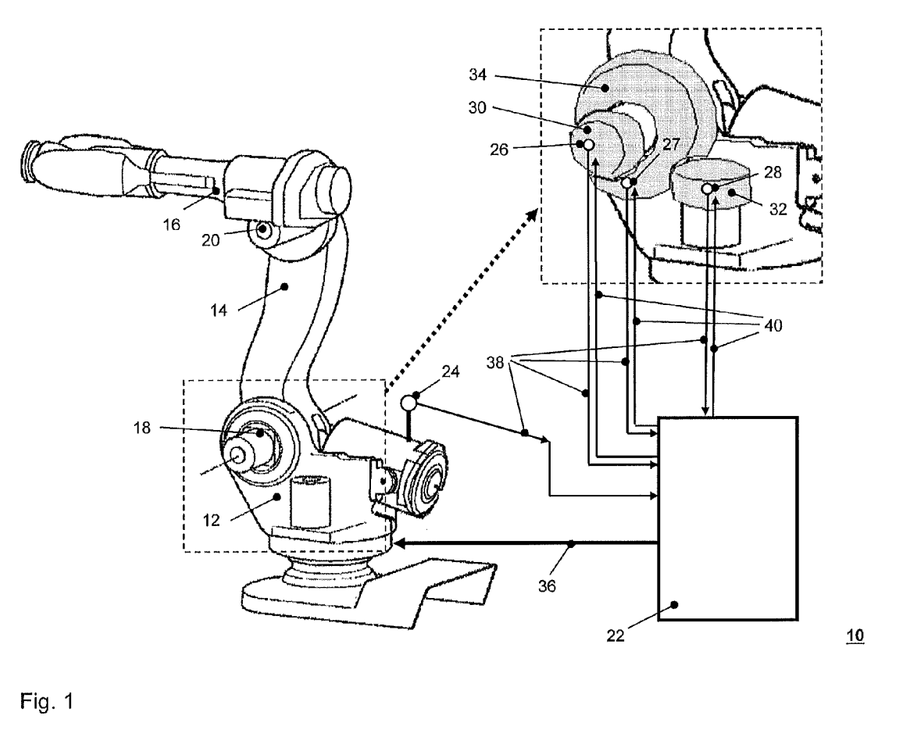
FIG. 1 shows an exemplary robot manipulator system.

FIG. 1 shows an exemplary robot manipulator system 10. An exemplary robot manipulator comprises a kinematic chain of several stiff robot manipulator segments 12, 14, 16, which are linked together by hinged joints 18, 20. The robot manipulator can comprise stiff robot manipulator segments and hinged joints (without reference number), whereas an exemplary total of five degrees of freedom in movement of the robot manipulator can be considered. A robot controller 22 is connected to the robot manipulator by a connection cable 36. The robot controller can comprise a computing device and some electrical amplifiers, which drive is associated with electrical motors for each stiff robot manipulator segment. A robot program can be stored within a memory of the robot controller, whereas the robot controller determines each desired revolution of each electrical motor, so that in the end the tip of the robot manipulator performs the desired movement according to the robot program.

An ambient temperature sensor 24 can be mounted on a chassis of a spring cylinder for damping a pivoting movement. The sensor 24 is connected to the robot controller 22 by a data connection line 38. Based on a measured temperature value the robot controller 22 determines an amount of heat energy to be applied on heatable covers 30, 32, 34, which are shown in a detailed drawing. Of course, in an exemplary embodiment the heatable covers 30, 32, 34 are not limited to being only active in the case where a movement program is executed. The heatable covers can also be active when for example, the robot is in a stand-by or wait mode.

The heatable cover 30 can be attached to the outer surface of the chassis of an electrical motor drive for pivoting a part of the robot arm, whereas the heatable cover 32 can be attached to the outer surface of the chassis of an electrical motor drive for rotating the robot arm around its base. The heatable cover 34 is attached to the outer surface of a gearbox which is partly filled with gear oil. All heatable covers 30, 32, 34 can comprise on their inner side—face to the associated surface area of the robot manipulator—temperature sensors 26, 27, 28 for measuring the temperature of the robot manipulator segments to which they are attached. A data connection 38 can be included to provide measured temperature values to the robot controller 22. A common data connection and/or an—at least in part—wireless data connection can be provided. The heatable covers 30, 32, 34 can each comprise a heat wire as a heater which is driven by the robot controller 22 over the connection lines 40, in this case an electrical cable. Therefore the robot controller can comprise amplifiers for driving the heaters.

Figure 2:
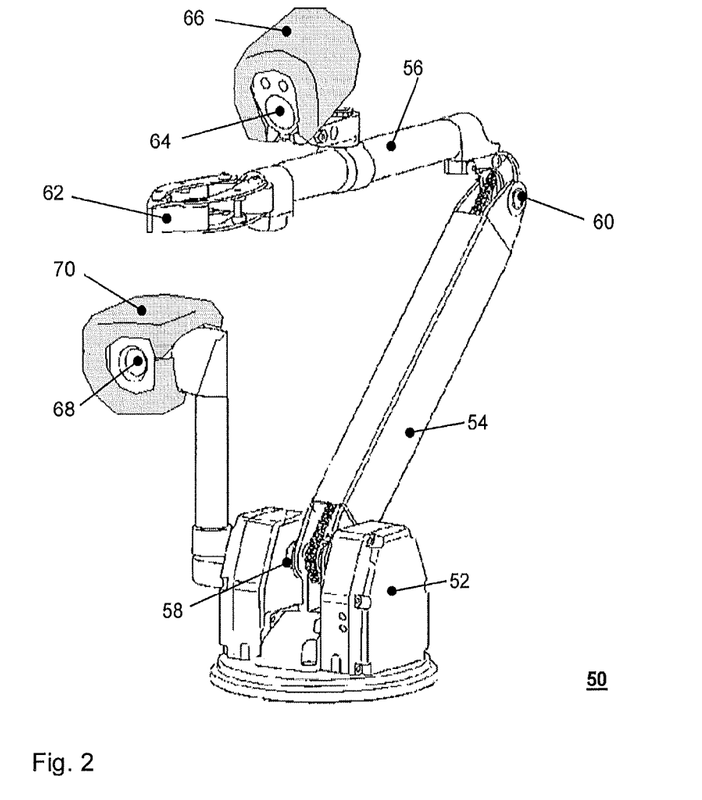
FIG. 2 shows a second exemplary robot manipulator with additional devices.

FIG. 2 shows a second robot manipulator with additional devices in a drawing 50, where an associated robot controller is not shown. The robot manipulator can comprise a kinematic chain of stiff robot manipulator segments 52, 54, 56 which are connected with hinged joints 58, 60. A gripper tool 62 can be attached to the tip of the robot manipulator, which is turnable around an axis of rotation. Furthermore the kinematic chain mentioned herein can be turnable around the robot base. In an exemplary embodiment, a total of five degrees of freedom in movement are provided for the movement of the gripper 62. A first additional device 64 (e.g., a camera), is attached to the stiff robot manipulator segment 56, of the upper robot arm. Thus the camera 64 has a good position to observe the working area of the gripper 62 in each position of the robot manipulator. This can be important for example to check if a workpiece has been gripped correctly. A second additional device 68 (e.g., a headlight), is attached to the stiff robot manipulator segment 52. Thus the working range of the robot manipulator can be illuminated such that sufficient light for the camera 64 is provided. To enable the functionality of the camera 64 and the headlight 68 also under cold environmental frame conditions, associated heatable covers 66, 70 are attached onto the associated additional devices 64, 68. Those additional heatable covers 66, 70 can also be controlled by the robot controller.

Figure 3:
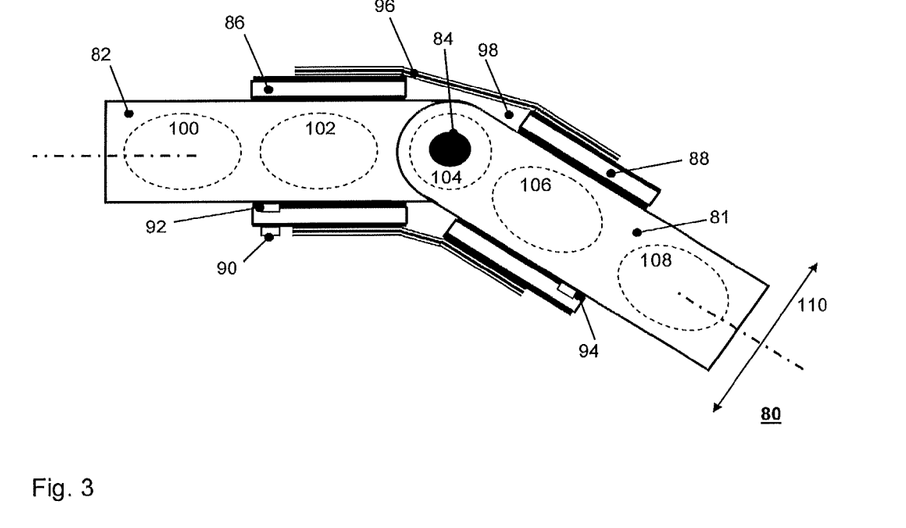
FIG. 3 shows exemplary adjacent manipulator segments with heatable covers and a flexible tube.

FIG. 3 shows a schematic detail drawing 80 of exemplary adjacent manipulator segments 81, 82 with attached heatable covers 86, 88 and a surrounding flexible tube 96. A common hinged joint 84 pivotably connects both manipulator segments 81, 82. Even the hinged joint 84 can be assumed to be a temperature critical component. A heatable cover is not directly connected to the parts of the hinged joint 84, as it could reduce its freedom of movement. Thus heat energy is applicable with the heatable covers 86, 88 onto the adjacent manipulator segments 81, 82, which as such are not temperature critical. Therefore the temperature in the segment areas surrounded by the heatable covers will increase compared to the lower ambient temperature, whereas temperature areas 102 and 106 with a first temperature will rise. The heat energy applied thereon can dissipate on one hand to the outer temperature areas 100 and 108. On the other hand, the applied heat is conducted by the robot manipulator segments themselves to the area around the hinged joint 84, where a temperature area 104 with a second temperature arises. Due to dissipation of heat energy from this area 104 to the environment, the second temperature is lower than the first temperature. To reduce the amount of dissipating heat energy, the flexible tube 96 can be provided. This is for example made of a stretchable material which can avoid air exchange in between a surrounded intermediate space 98 and the environment. According to an exemplary embodiment, the first temperature within the temperature areas 102, 106 can be increased such that the temperature area 104 around the hinged joint is sufficiently high for an uncritical operation.

The heatable covers 86, 88 can for example comprise three layers, whereas the inner layer can be built of a heat conductible material. In this example this feature is optional, as the robot manipulator segments 81, 82 can be built from a metal, which is a good head conductor. A medium layer—in the drawing in white colour—can be a thermal insulation against the environment, which can reduce an associated heat dissipation. Such a layer could be made from a solid foam material for example. A third outer layer—for example a kind of foil—can provide mechanical protection against mechanical impacts from outside. A not shown heat wire can be included for applying heat energy within the heatable cover which can, for example, be arranged in between the inner and the medium layer. Thus the heat energy from the heat wires can be easily applicable onto the robot manipulator segments 81, 82, whereas a thermal insulation against the environment can be provided. Sensors 92, 94 for measuring the temperature of the associated robot manipulator segments are as well integrated into the heatable covers 86, 88, and a sensor 90 for measuring the ambient temperature can be integrated on the outer side of the heatable cover 86. Those sensors are foreseen to be connected to an associated robot controller.

Figure 4:
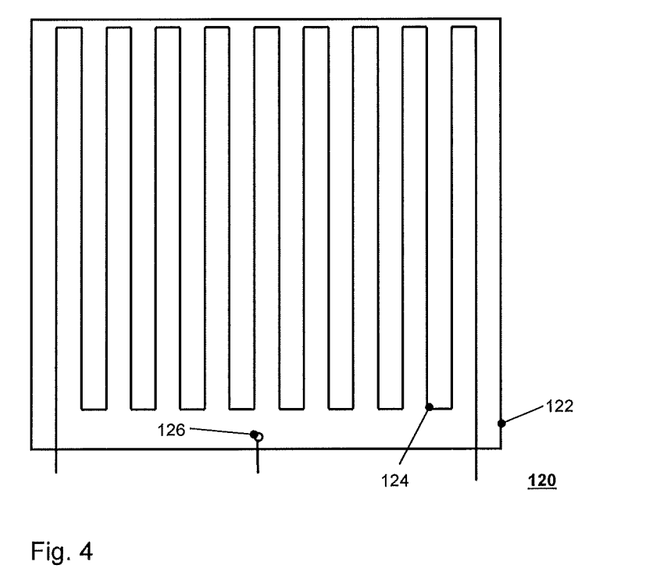
FIG. 4 shows an exemplary sixth heatable cover with an electrical heat wire.

FIG. 4 shows an exemplary sixth heatable cover 122 with an electrical heat wire 124 in a drawing 120. The heatable cover 122 can comprise two not shown flat layers, an inner one which is a good heat conductor and a second one which is thermally insulating, whereas the heat wire 124 is arranged in between them. To apply heat energy homogenously within the heated cover, the heat wire 124 can be arranged in a meander-like manner. A temperature sensor 126 can be integrated in the heatable cover 122.

Figure 5:
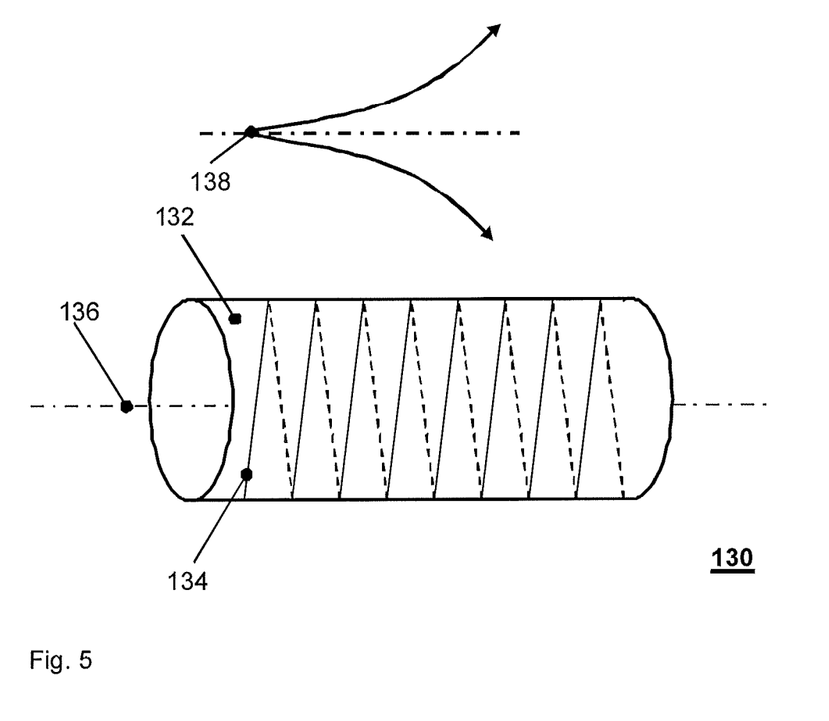
FIG. 5 shows an exemplary seventh heatable cover arranged as flexible tube.

FIG. 5 shows an exemplary seventh heatable cover arranged as a flexible tube 132 around an axis of rotation 136. An integrated heat wire 134 surrounds the axis of rotation in a helix-like form. A not shown hinged joint with a longitudinal extension along the axis of rotation 136 can be surrounded by the flexible tube 132. Due to the helix-like arrangement of the heat wire 134, the flexible tube is bendable in the direction of pivoting of the hinged joint, as indicated in the sketch with reference number 138.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SIGNS 10 exemplary robot manipulator system
12 first stiff manipulator segment of first manipulator
14 second stiff manipulator segment of first manipulator
16 third stiff manipulator segment of first manipulator
18 first hinged joint of first manipulator
20 second hinged joint of first manipulator
22 robot controller
24 ambient temperature sensor
26 temperature sensor of first heatable cover
27 temperature sensor of third heatable cover
28 temperature sensor of second heatable cover
30 first heatable cover
32 second heatable cover
34 third heatable cover
36 connection for controlling the manipulator
38 data connection for measured values from temperature sensors
40 connection for heaters
50 second robot manipulator with additional devices
52 first stiff manipulator segment of second manipulator
54 second stiff manipulator segment of second manipulator
56 third stiff manipulator segment of second manipulator
58 first hinged joint of second manipulator
60 second hinged joint of second manipulator
62 gripper
64 first additional device
66 heatable cover attached to first additional device
68 second additional device
70 heatable cover attached to second additional device
80 adjacent manipulator segments with heatable covers and flexible tube
81 first adjacent manipulator segment
82 second adjacent manipulator segment
84 common hinged joint
86 forth heatable cover attached to first adjacent manipulator segment
88 fifth heatable cover attached to second adjacent manipulator segment
90 temperature sensor on outer side of forth heatable cover
92 temperature sensor on inner side of forth heatable cover
94 temperature sensor on inner side of fifth heatable cover
96 flexible tube
98 intermediate space surrounded by flexible tube 100 first temperature area
102 second temperature area
104 third temperature area
106 forth temperature area
108 fifth temperature area
110 direction of pivoting
120 sixth heatable cover with electrical heat wire
122 cover
124 heat wire arranged in form of a meander
126 temperature sensor of sixth heatable cover
130 seventh heatable cover arranged as flexible tube
132 cover
134 heat wire arranged in form of a helix
136 axis of rotation
138 bending directions of the tube

The invention claimed is:

1. Robot manipulator system, comprising:
a robot manipulator with a kinematic chain of stiff robot manipulator segments, which are linked together by hinged joints;
a robot controller for controlling robot manipulator movement via execution of a robot program;
at least one temperature sensor for providing measured temperature values;
at least one heatable cover attached onto at least one manipulator segment for applying heat energy thereon and attached on at least two adjacent manipulator segments which are linked together by a common hinged joint;
a control unit for controlling an amount of heat energy dependent on measured temperature values of the at least one temperature sensor; and
a flexible tube in between the heatable covers attached on the adjacent manipulator segments, which surrounds the common hinged joint and at least a part of the heatable covers.

2. Robot manipulator system according to claim 1, wherein the control unit is part of the robot controller.

3. Robot manipulator system according to claim 1, comprising:
an additional device mounted on the robot manipulator; and
an additional heatable cover attached on the additional device.

4. Robot manipulator system according to claim 1, wherein the at least one heatable cover comprises:
a thermal insulating outer layer for thermal insulation of an environment.

5. Robot manipulator system according to claim 1, wherein the at least one heatable cover comprises:
a thermal conducting inner layer for heat energy distribution towards the manipulator segments.

6. Robot manipulator system according to claim 1, wherein the robot controller is configured to reduce a movement speed as planned while executing a robot program when a measured temperature value of the at least one temperature sensor is lower than a predetermined limit.

7. Robot manipulator system according to claim 1, wherein the robot controller is configured to execute a steady motion robot program when no further robot program is selected for execution.

8. Robot manipulator system according to claim 1, comprising:
an additional device mounted on the robot manipulator; and
an additional heatable cover attached on the additional device.

9. Robot manipulator system according to claim 1, wherein the at least one heatable cover comprises:
an electrical heater.

10. Robot manipulator system, comprising:
a robot manipulator with a kinematic chain of stiff robot manipulator segments, which are linked together by hinged joints;
a robot controller for controlling robot manipulator movement via execution of a robot program;
at least one temperature sensor for providing measured temperature values;
at least one heatable cover attached onto at least one manipulator segment for applying heat energy thereon; and
a control unit for controlling an amount of heat energy dependent on measured temperature values of the at least one temperature sensor,
wherein the heatable cover is attached as a flexible tube around a hinged joint, where the heatable cover comprises:
a wire-like heating element that is arranged as a helix or meander mainly crosswise to a longitudinal extension of the hinged joint.

11. Robot manipulator system according to claim 10, wherein the at least one heatable cover comprises:
an electrical heater.

12. Robot manipulator system according to claim 11, comprising:
several heatable covers attached onto the robot manipulator, which include associated temperature sensors on their inner side to provide values of measured temperatures to an evaluation device for determining a lowest measured temperature therefrom, whereas a value of the lowest measured temperature will be provided to the robot controller.

13. Robot manipulator system according to claim 10, comprising:
heatable covers attached on at least two adjacent manipulator segments which are linked together by a common hinged joint.

14. Robot manipulator system, comprising:
a robot manipulator with a kinematic chain of stiff robot manipulator segments, which are linked together by hinged joints;
a robot controller for controlling robot manipulator movement via execution of a robot program;
at least one temperature sensor for providing measured temperature values;
at least one heatable cover attached onto at least one manipulator segment for applying heat energy thereon;
a control unit for controlling an amount of heat energy dependent on measured temperature values of the at least one temperature sensor;
an additional device mounted on the robot manipulator; and
an additional heatable cover attached on the additional device,
wherein an attached heatable cover comprises:
a sensor on its outer side for measuring an ambient temperature and/or a sensor on its inner side for measuring temperature of a covered area of an associated manipulator segment of the additional device.

15. Robot manipulator system according to claim 14, wherein the control unit is configured such that an amount of heat to be applied by the at least one heatable cover will depend on measured values of the ambient temperature and measured values of the temperature of at least one manipulator segment.

16. Robot manipulator system according to claim 14, comprising:
several heatable covers attached onto the robot manipulator, which include associated temperature sensors on their inner side to provide values of measured temperatures to an evaluation device for determining a lowest measured temperature therefrom, whereas a value of the lowest measured temperature will be provided to the robot controller.

* * * * *